United States Patent [19]

Ohtsuki et al.

[11] 4,407,689

[45] Oct. 4, 1983

[54] PROCESS FOR PRODUCTION OF LAMINATED MEMBER

[75] Inventors: Akira Ohtsuki; Hirokichi Ishino; Hiromu Sakai; Susumu Tsuchiko; Kazuo Tawara; Takahiko Yamasoba, all of Tokyo, Japan

[73] Assignee: Toyo Ink Manufacturing Co., Ltd., Tokyo, Japan

[21] Appl. No.: 427,038

[22] Filed: Sep. 29, 1982

Related U.S. Application Data

[63] Continuation of Ser. No. 218,134, Dec. 19, 1980, abandoned.

[30] Foreign Application Priority Data

Dec. 21, 1979 [JP] Japan .................................. 54/165700
Mar. 10, 1980 [JP] Japan .................................. 55/29159

[51] Int. Cl.³ .............................................. B29D 7/14
[52] U.S. Cl. ................................ 156/243; 156/244.11; 156/244.23; 156/244.24; 156/244.27; 156/327; 156/332; 428/461; 428/463
[58] Field of Search ............. 156/243, 244.11, 244.22, 156/244.23, 244.24, 244.27, 327, 332; 428/461, 463

[56] References Cited

U.S. PATENT DOCUMENTS

| 3,647,617 | 3/1972 | Rieke et al. | 428/461 |
| 3,987,122 | 10/1976 | Bartz et al. | 156/327 |
| 4,092,452 | 5/1978 | Hori et al. | 428/463 |

FOREIGN PATENT DOCUMENTS

| 54-85 | 1/1979 | Japan . |
| 54-120098 | 9/1979 | Japan . |
| 55-39329 | 3/1980 | Japan . |
| 55-128435 | 10/1980 | Japan . |
| 55-137920 | 10/1980 | Japan . |
| 1367662 | 9/1974 | United Kingdom . |

*Primary Examiner*—Caleb Weston
*Attorney, Agent, or Firm*—Sughrue, Mion, Zinn, Macpeak & Seas

[57] ABSTRACT

A laminated member comprising a metal foil or sheet (1) and a thermoplastic resin film (4) bonded together with an adhesive selected from a carboxyl group-containing polyolefin and a polyolefin based resin prepared by heat-compounding a carboxyl group-containing polyolefin and a metal compound is heated at a higher temperature than the melting temperature of the adhesive and pressed using a heating roll (3) and a nip roll (6). The laminated member is then cooled at the heat distortion temperature of the adhesive or at a temperature higher than the heat distortion temperature while applying a pressure of at least 0.2 kg/cm² with a cooling roll (10) and a nip roll (11).

10 Claims, 2 Drawing Figures

PROCESS FOR PRODUCTION OF LAMINATED MEMBER

This is a continuation of application Ser. No. 218,134, filed Dec. 19, 1980, now abandoned.

FIELD OF THE INVENTION

This invention relates to a process for production of a laminated member comprising a metal foil or sheet and a plastic film such as a polyolefin film. More particularly, it relates to a process for producing a laminated member by using as an adhesive a carboxyl group-containing polyolefin or a polyolefin based resin prepared by heat-compounding a carboxyl group-containing polyolefin and a metal compound, in which laminated member there is no unevenness in adhesion strength and the occurrence of wrinkles is inhibited.

DESCRIPTION OF THE PRIOR ART

Recently, as packaging materials for food, etc., or building materials, composite laminates having characteristics deriving from each component constituting the composite laminate have increasingly been used in place of single-layer members. In particular, a composite laminate comprising a polyolefin film or nylon film having hygienic properties and heat-solubility and an aluminum foil having excellent gas barrier properties has been used as one of the best food packaging materials.

In producing such composite laminates, a polyurethane based adhesive is generally used as an adhesive because of poor adhesion between the polyolefin or nylon film and the metal (e.g., aluminum) foil. The polyurethane based adhesive, however, suffers disadvantages in that low molecular weight compounds contained in the polyurethane based adhesive may move into food, the foaming of the adhesive lowers the value of the composite laminate, and there is unevenness in adhesion strength. Under such circumstances, a method has been proposed in which a carboxyl group-containing polyolefin or a polyolefin based resin prepared by heat-compounding a carboxyl group-containing polyolefin and a metal compound is used in place of the polyurethane resin.

In such a method, however, a sufficient adhesion strength cannot be obtained unless pressure is applied onto the laminate having the adhesive layer between the polyolefin film and the aluminum foil at a temperature higher than the melting temperature of the adhesive. The adhesives as used in such a method, therefore, are different from conventional adhesives in that they need an additional heating and pressing step. Furthermore, when the laminate is wound immediately after the application of heat and pressure, the layers of laminate stick together owing to the remaining heat. It is, therefore, necessary to wind the laminate after cooling it.

Inventors' studies have revealed that the steps as described above produce partial unevenness in adhesion strength and often produce wrinkles. As a result of extensive investigations to solve these problems, it has now been found that they can be removed by incorporating the pressure-application and cooling steps under specific conditions. This invention has been completed based upon the novel findings.

On the other hand, for the purpose of preventing the formation of rust on a metal plate, improving its chemical resistance, and improving its decorative effect, or for the purpose of preventing contact between food or drink in a can and the metallic inner surface of the can, coating films are employed using a varieties of coatings.

In these days, however, the situation of supply of resources and energy has grown worse and the problem of consumption of a large quantity of energy required for baking coating has been highlighted not only in the coating of organic solvent type coating material, but also in the coating of aqueous solvent type coating material.

Another object of this invention, therefore, is to solve the problem of energy required for evaporation of a solvent contained in coating material and for baking, and to produce a laminated member which is excellent in its contents protection ability, hygienic properties, adhesion properties and post-moldability when used in a can, particularly a drink can or a food can, which is useful mainly as a material for forming a can, and which is free from unevenness in adhesion strength.

As described in detail, the lamination of a metal plate and a plastic film using the adhesive needs a heat and pressure application step and furthermore produces unevenness in adhesion strength and wrinkles.

SUMMARY OF THE INVENTION

A process for producing a laminated member including a metal foil or sheet (1) and a thermoplastic resin film (4) said process comprising steps of:

heating the foil or sheet (1) and the film (4) with at least one adhesive disposed therebetween, said adhesive being selected from a carboxyl group-containing polyolefin and a polyolefin based resin prepared by heat-compounding a carboxyl group-containing polyolefin and a metal compound, at a temperature which is higher than the melting temperature of the adhesive and pressing to form a laminated member (8); and cooling the laminated member (8) at the heat distortion temperature of the adhesive or at a temperature higher than the heat distortion temperature while applying a pressure of at least 0.2 kg/cm$^2$ using a cooling roll (10) and a nip roll (11).

DETAILED DESCRIPTION OF THE INVENTION

Figure 1:
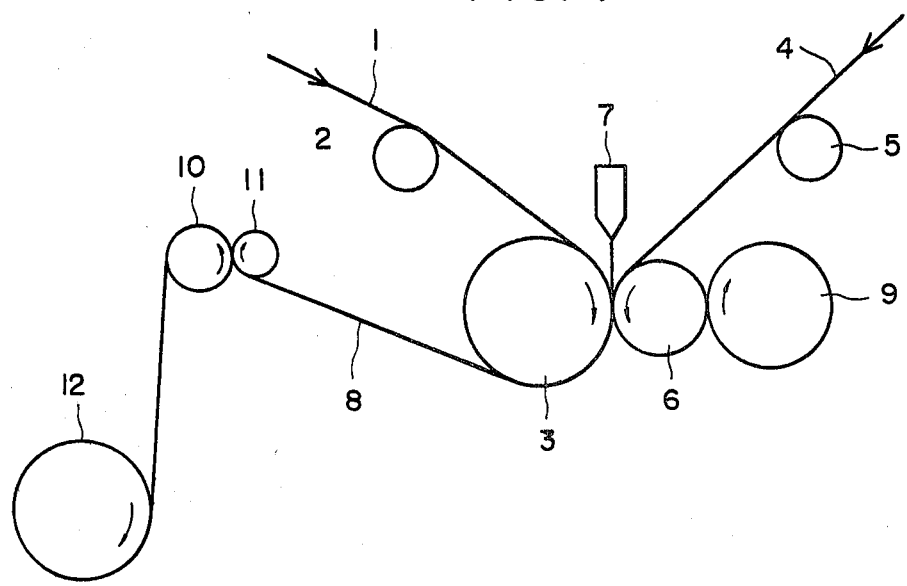
FIGS. 1 and 2 are schematic side view of apparatus used in process for producing a laminated member according to this invention.

The metal foil or sheet as used in this invention may be made of aluminum, tin plate, tin-free steel, black plate, copper for example, and its thickness is usually about 5 to 1,000 $\mu$m and preferably about 10 to 300 $\mu$m although it varies depending upon the purpose. As necessary, a suitable chemical treatment or plating treatment may be applied to the surface of the metal foil or sheet. Additionally, a metal foil or sheet which has already been subjected to a treatment, e.g., printing or coating, applied on the rear surface thereof can be used in this invention.

In this invention, it is preferred to use a metal foil, e.g., an aluminum foil, which has previously been backed with a heat-resistant film, e.g., polyamide or polyester, since the metal foil is generally low in mechanical strength. Additionally, a suitable print layer may be formed between the heat-resistant resin layer and the aluminum foil. This provides a laminated member comprising polyester (or polyamide) layer/print layer/aluminum foil/polyolefin based adhesive layer/- polyolefin film, and this laminated member can be used as a soft packaging material with the polyester (or polyamide) layer as the outside layer and the polyolefin film as the inside layer.

In producing a can or container using a laminated member including a metal plate, the laminated member is side-seamed with a thermoplastic resin film inside and the metal plate outside by use of a known technique, and top and bottom members stamped out from the laminated member are provided for the side-seamed laminated member. On the external surface of the metal plate can be laminated anohter resin film by use of the polyolefin resin as an adhesive in the same manner as in the internal surface thereby to provide a laminated member of five layer construction. Additionally, a suitable print layer, coating layer or film layer can be previously provided on a surface of the metal plate which is destined to become an external surface when molded to form a can or container.

The thermoplastic resin film as used in this invention may be a single resin film produced from, for example, polyolefin, polyamide, polyester, polyvinyl chloride, polyvinylidene chloride, polybutadiene, polycarbonate, an ethylene-vinyl acetate compolymer, or polyvinyl alcohol, or a composite film produced therefrom by coextrusion, for example.

If the thermoplastic resin film is to be used in a food- or drink-packaging material and is to be in contact with the food or drink, polyolefins (e.g., polyethylene, polypropylene, an ethylene-propylene copolymer, or polybutene), or polyamides (e.g., 12-nylon or 11-nylon) are preferably used.

The thickness of the thermoplastic resin film is usually about 10 to 1,000 $\mu$m and preferably about 30 to 100 $\mu$m. The thermoplastic resin film may contain additives such as a filler, or a coloring agent, etc., as required. Furthermore, printing and/or painting may be applied to the thermoplastic resin film.

In preparing a laminated member of this invention including two thermoplastic resin film layers as described above, the two layers may be produced from either the same resin or different resins. Furthermore, this invention includes an embodiment in which one of the two layers is paper.

Hereinafter, the carboxyl group-containing polyolefin and the polyolefin based resin prepared by heat-compounding the carboxyl group-containing polyolefin and the metal compound will be described.

Carboxyl group-containing polyolefins are those prepared by copolymerizing an olefinic monomer, e.g., ethylene, propylene or butene, with one or more $\alpha,\beta$-ethylenically ethylenically unsaturated carboxylic acids (e.g., acrylic acid, methacrylic acid, itaconic acid, fumaric acid, maleic acid or maleic anhydride), or by graft-polymerizing one or more $\alpha,\beta$-ethylenically unsaturated carboxylic acids onto a polyolefin (e.g., polyethylene, polypropylene, an ethylene-propylene copolymer or polybutene). Other polymerizable monomers may be used as required. Alternatively, esters of $\alpha,\beta$-ethylenically unsaturated carboxylic acids may be used and after copolymerization or graft-polymerization of the esters, the ester group is saponified into the carboxyl group to provide the corresponding carboxyl group-containing polyolefin.

Where the laminated member obtained by the method of this invention is used for the production of a retort sterilization package or the like and is thus required to have heat resistance, it is preferred to employ a highly crystalline polyolefins as the polyolefin, e.g., high density polyethylene or polypropylene.

In connection with the amount of the $\alpha,\beta$-ethylenically unsaturated carboxylic acid being used, it is preferred that 0.01 to 50 parts by weight of the carboxylic acid is reacted with 100 parts by weight of the olefin component. In smaller amounts than 0.01 part by weight, the adhesion capability of the adhesive obtained tends to be low. On the other hand, in greater amounts than 50 parts by weight, no increase in the adhesion capability can be observed.

While the carboxyl group-containing polyolefin can satisfactorily be used in this invention, the following polyolefin based resin is preferably used in this invention because it is excellent in its adhesion capability after retort sterilization:

The polyolefin based resin is prepared by compounding a metal compound with a carboxyl group-containing polyolefin. Metal compounds which can be used in preparing such polyolefin based resins include carbonates, sulfates, acetates, oxides, hydroxides and organic compounds of sodium, potassium, magnesium, zinc, aluminum, copper, and nickel. Where the final laminated member is used in medicine, food and related applications, metal compounds of magnesium, calcium, zinc and aluminum are preferably used. In particular, an aluminum compound is preferred, with aluminum hydroxide being more preferred.

The metal compound is preferably compounded in an amount of 0.05 to 10 parts by weight per 100 parts by weight of the carboxyl group-containing polyolefin. When the metal compound is used within the above range, high adhesion strength is obtained. When it is used in an amount of less than 0.05 part by weight, it can be difficult to obtain higher adhesion strength. On the other hand, the use of the metal compound in an amount of more than 10 parts by weight not only produces no increase in the adhesion strength, but also can cause foaming of the adhesive during heat-melting the polyolefin based resin composition, resulting in an uneven coating of the adhesive on the support.

As an alternative to the metal compound being mixed with and dispersed in the carboxyl group-containing polyolefin, metal ions may be coordinated to form a salt or metal ion may form cross-linkages.

A third component, e.g., polybutadiene, can be used together in synthesizing the polyolefin based resin composition. In this case, however, it is necessary to select a third component which exerts no adverse influences on the adhesive properties.

Various methods can be employed to produce the polyolefin based resin. In one method the carboxyl group-containing polyolefin and the metal compound are mixed while at the same time heating. In such a method, the carboxyl group-containing polyolefin and the metal compound are heated at a temperature of about 100° to 220° C. and uniformly mixed for about 5 to 120 minutes. In another method, the polyolefin, $\alpha,\beta$-ethylenically unsaturated carboxylic acid and metal compound are heat-mixed at the same time to effect graft polymerization. In some cases, an unmodified polyolefin or a resin having excellent hygienic properties can be compounded with the polyolefin based resin.

For providing a layer of the thus-obtained carboxyl group-containing polyolefin or polyolefin based resin, any suitable method may be employed. For example, the polyolefin or resin may be dissolved or dispersed in an organic solvent, such as xylene or Solvesso (produced by Esso Company) and/or water and applied as a solution or dispersion to one of the layers to be formed. The polyolefin or resin may be laminated on one of the layers to be joined or interposed between the layers to be joined by the use of an extruder. Alternatively, the polyolefin or resin may be ground into a powder and coated onto one of the layers to be joined.

For the carboxyl group-containing polyolefin or polyolefin based resin, adhesive properties are, of course, required, and when it is used in a food packaging material, for example, hygienic properties are strictly necessary. It is, therefore, preferred to wash the carboxyl group-containing polyolefin or polyolefin based resin with, for example, acetone, methyl ethyl ketone, ethyl acetate in the course of or after the synthesis thereof. The polyolefin or resin subjected to such a washing treatment exhibits markedly excellent adhesive properties. The completion of the washing can be confirmed by examining for the presence of low molecular weight compounds or homopolymers by liquid chromatography (GPC).

The laminated member obtained by the method of this invention can advantageously be used as a packaging material for food. Where it is used as a material for packaging food to be sterilized in a retort, it is preferred to use high density polyethylene or polypropylene having a relatively high heat resistance as the polyolefin.

This invention will be described in greater detail with reference to FIGS. 1 and 2 of the accompanying drawings.

Referring to FIG. 1, a metal foil or sheet 1 which may be backed with a heat-resistant resin travels from a feed roll (not shown) through a guide roll 2 to a heated roll 3, and a thermoplastic resin film 4 travels from a feed roll (not shown) through a guide roll 5 to a nip roll 6. A carboxyl group-containing polyolefin or polyolefin based resin used as an adhesive is melted in an extruder (not shown), extruded through a T-die 7 in the form of a film, and pressed between the heated roll 3 and nip roll 6 at about 0.2 to 20 kg/cm$^2$ whereby the adhesive bonds the metal foil or sheet 1 and the thermoplastic resin film 4 together to provide a laminated member 8.

In this embodiment, an elastomeric rubber material is used in the surface of the nip roll 6 and becomes heated and sticky. The surface of the nip roll 6 is therefore preferably cooled by bringing it in contacted with a cooling back-up roll 9. The cooling back-up roll 9 is itself cooled by passing a cooling medium, e.g., water through the interior thereof.

The laminated member 8 may be cooled by a suitable cooling means, if required, for example, by allowing it to cool, by forced air cooling or by bringing into contact with a preliminary cooling roll (not shown). The member 8 is then passed between a cooling roll 10 and a nip roll 11 at the heat distortion temperature of the adhesive or at a temperature higher than the heat distortion temperature, usually between the heat distortion temperature and the melting point, preferably at the softening point or more, where it is pressed at a pressure of 0.2 kg/cm$^2$ or more and at the same time, cooled. Thereafter, the laminated member 8 is wound on a roll 12 or transferred to a subsequent cutting step (not shown).

The cooling roll 10 is cooled by a known technique, for example, by passing a cooling medium, e.g., water through the interior thereof. The temperature of the cooling roll 10 is usually about 5° to 50° C. A cooling means can be employed which is so designed that the temperature of the laminated member 8 just after passing through the second step is usually about 60° C. or less and preferably about 40° C. or less.

When a polyethylene-based adhesive is used, it is preferred that the laminated member 8 enter the second step where pressure and cooling are applied, at a temperature of about 90° to 160° C. When a polypropylene based adhesive is used, it is preferred for the laminated member 8 to enter the second step at a temperature of about 110° to 180° C. If the temperature is too low, the objects of this invention will not be attained, whereas if the temperature is extremely high, the thermoplastic resin film will be deteriorated, with the result that the terms of the laminated member 8, on the roll 12 will tend to stick together to form a block on the roll 12 which makes the operation difficult.

The pressure being applied at the second step is about 0.2 kg/cm$^2$ or more and preferably about 1 kg/cm$^2$ or more. Lower pressures cannot inhibit the occurrence of wrinkles and remove the unevenness in adhesion strength. Commercially, the pressure is preferably about 1 to 20 kg/cm$^2$.

While the reason why the unevenness in adhesion strength and the formation of wrinkles are solved by the second step, i.e., pressure-application and cooling step of this invention, is not yet fully understood, it is believed that the adhesive just after being heated to above its melting point has no definite direction of orientation, but the direction of orientation becomes definite at the subsequent pressure-application and cooling step whereby stabilized adhesion strength is attained.

To ensure the most effective removal of wrinkles, it is preferred for the laminated member 8 to come into contact first with the nip roll 11 and then with the cooling roll 10.

Figure 2:
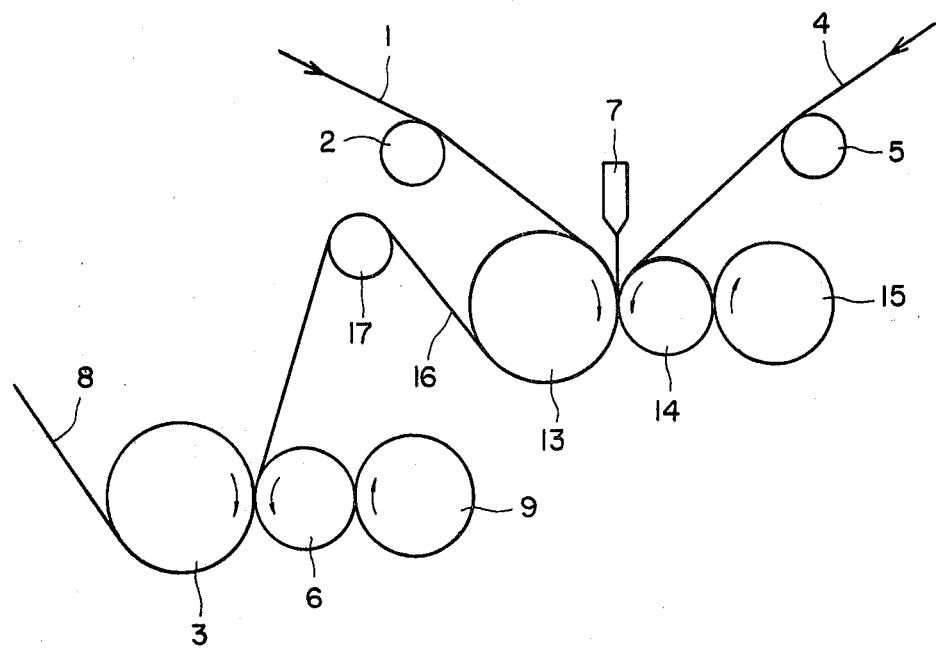

FIG. 2 shows another embodiment of this invention in which an adhesive is passed between a cooling roll 13 and a nip roll 14 where it is previously cooled and a preliminarily bonded member 16 is formed, and the preliminarily bonded member 16 is passed to a heating and pressure-application step as described with reference to FIG. 1 where laminated member 8 is obtained. Thereafter, the laminated member 8 is passed to the same pressure-application and cooling step as in FIG. 1 (not shown). In FIG. 2, the reference numerals 15 and 17 indicate a cooling back-up roll and a guide roll, respectively.

The first step and the second step of this invention are not necessarily connected continuously, and in some cases, they may be completely separated. An additional step prior to the first step or an additional step after the second step can be employed as necessary.

The nip roll 11 applies uniform pressure on the whole surface of the laminated member 8 travelling thereon, and it preferably has an elastic material on at least the surface thereof. A typical example of such elastic material is silicon rubber. This application of pressure permits to remove the unevenness in adhesion strength which often occurs at the center and ends of the roll when the tension is applied by application of pressure, and furthermore to inhibit the formation of wrinkles.

The following examples are given to illustrate this invention in greater detail. All parts are by weight.

EXAMPLE 1

100 parts of a carboxyl group-containing polyolefin which had been prepared by graft-polymerizing maleic anhydride onto polypropylene in a proportion of about 0.2% by weight and fully washed and 1.0 part of aluminum hydroxide were compounded, fully mixed in a Henschel mixer, melted in an extruder heated up to 180° C., and extruded in the form of pellet. The polyolefin composition thus-obtained had a heat distortion temperature of 120° C., a Vicat-softening temperature of 145° C. and a melting temperature of 165° C.

These pellets were melted at about 180° C. and extruded through 7 in the apparatus as described with reference to FIG. 2 between a 9 $\mu$m aluminum foil backed with a polyester film and a 70$\mu$ polypropylene film. The peripheral speed of the cooling roll 13 was about 70 m/min, which was the same as that of each film. The surface temperature of the cooling roll 13 was maintained at about 30° C. by passing water through the interior of the cooling roll 13.

The polyolefin composition so extruded was uniformly sandwiched. Troubles such as protrusion of adhesive, breakage of adhesive, etc., did not occur and the operation proceeded smoothly.

Thereafter, the three-layer member as obtained above was brought in contact with the heat roll 3 having a surface temperature of 220° C. for 0.5 second, pressed at about 0.5 kg/cm$^2$ and then allowed to cool. The member was then transferred to the pressure-application and cooling step as shown in FIG. 1.

First, the dependency of adhesion strength on the temperature of the polyolefin composition was examined by varying the temperature of the polyolefin composition just before entering the second step at an interval of 10° C. within a temperature range of from 60° C. to 160° C. while maintaining the applied pressure at 3 kg/cm$^2$. The laminates obtained did not suffer formation of wrinkles but exhibited excellent adhesion strength without any unevenness therein when the temperature of the polyolefin composition was above 120° C. On the other hand, when the temperature was below 110° C. formation of wrinkles occurred and remarkable wrinkle formation was observed at a temperature of below 100° C.

Upon formation of bags from the laminates produced using various temperatures of the polyolefin composition not all bags that were made from laminates having wrinkles at their sealing portion could provide perfect sealability or air-tightness.

Secondly, the dependency of the adhesion strength on the pressure applied on the member was examined by varying the pressure, i.e., using a pressure of 0.2, 1, 5 or 10 kg/cm$^2$ while maintaining the temperature of the polyolefin composition just before entering the second step at 145° C. The laminates thus-obtained did not form wrinkles regardless of the pressure employed. Further, bags produced from the laminates obtained according to the process of this invention were free from the defects which the laminated packaging materials produced according to the conventional process suffer.

COMPARATIVE EXAMPLE 1

The procedure of Example 1 was repeated wherein the nip roll 11 was removed, the temperature of the polyolefin composition just before entering the second step was maintained at 140° C., and an average tension value 2.0 kg/cm$^2$ was used.

The central area of the laminated member so obtained showed an adhesion strength of about 1,050 g/15 mm, whereas side areas, an adhesion strength of only about 580 g/15 mm. It can thus be seen that the unevenness in adhesion strength is great, and furthermore the formation of wrinkles was observed.

This is considered due to the fact that when tension is applied onto the laminated member 8, the force is concentrated only at the central area.

EXAMPLE 2

The procedure of Example 1 was repeated wherein a composition prepared by mixing a carboxyl group-containing polyolefin and an unmodified polypropylene in a weight ratio of 1:1, said carboxyl group-containing polyolefin being obtained by graft-polymerizing maleic anhydride onto polypropylene in a proportion of 0.4% by weight, was used as an adhesive. This adhesive had substantially the same heat distortion temperature, softening temperature and melting temperature as those of the adhesive used in Example 1. The results obtained are nearly the same as those obtained in Example 1.

The laminated members obtained in Examples 1 and 2 were formed into a bag. These bags were charged with chinese mixed flavoring and sealed. They were subjected to retort sterilization at 120° C. for 30 minutes, and then the adhesion strength between the aluminum foil and the polypropylene film was measured in each bag. The adhesion strength of each of the bags was within the range that can practically be used. However, the adhesion strength of the laminated member of Example 1 was 1,050 g/15 mm, whereas that of the laminated member of Example 2 was lower by about 20%.

EXAMPLE 3

In this example, a carboxyl group-containing polypropylene prepared by graft-polymerizing maleic anhydride onto polypropylene in a proportion of about 0.3% by weight was used as an adhesive. This adhesive had substantially the same heat distortion temperature, softening temperature and melting temperature as those of the adhesive used in Example 1. It was melted at about 200° C. and extruded through a T-die in an apparatus, which was nearly the same as that shown in FIG. 1, between a tin plate and a 70$\mu$ polypropylene film. The member so obtained was brought in contact with the heat roll 3 having a surface temperature of 220° C. for 0.4 second, pressed at about 0.7 kg/cm$^2$ and then allowed to cool.

The member was then transferred to the pressure-application and cooling step as shown in FIG. 1.

In order to examine the dependency of the adhesion strength on the temperature, the procedure of Example 1 was repeated wherein the pressure applied was maintained at 2.5 kg/cm$^2$. The results obtained are nearly the same as those obtained in Example 1. Moreover, in order to examine the dependency of the adhesion strength on the pressure, the procedure of Example 1 was repeated wherein the temperature of the adhesive just before entering the second step was maintained at 140° C. The results obtained are nearly the same as those obtained in Example 1.

EXAMPLE 4

In this example, an aqueous dispersion of an ethylene-acrylic acid copolymer (acrylic acid content 5% by weight) was used as an adhesive. The dispersion had a Vicat-softening temperature of 105° C.

This adhesive was coated in a thickness of about 10 $\mu$m on a 9 $\mu$m aluminum foil backed with a nylon film and dried at 140° C. The aluminum foil was superposed on a 70 $\mu$m polyethylene film. The member so obtained was brought in contact with a heat roll having a surface temperature of 160° C. for 1.5 seconds and pressed at a pressure of about 2.5 kg/cm². Thereafter, the member was cooled to a temperature of 110° C. at a pressure of 4 kg/cm² by use of a cooling roll of a temperature of 25° C. and an elastic nip roll.

In the laminated member so obtained, no wrinkles and stripes were observed. The adhesion strength between the polyethylene film and the aluminum foil was 850 kg/15 mm.

While the invention has been described in detail and with reference to specific embodiments thereof, it will be apparent to one skilled in the art that various changes and modifications can be made therein without departing from the spirit and scope thereof.

What is claimed is:

1. A process for producing a laminated member including a metal foil or a metal foil backed with a thermoplastic resin (1) and a thermoplastic resin film (4) said process comprising steps of:
   heating the foil (1) and the film (4) with at least one adhesive disposed therebetween, said adhesive being selected from a carboxyl group-containing polyolefin and a polyolefin based resin prepared by heat-compounding a carboxyl group-containing polyolefin and a metal compound, at a temperature which is higher than the melting temperature of the adhesive and pressing to form a laminated member (8); and
   cooling the laminated member (8) at the heat distortion temperature of the adhesive or at a temperature higher than the heat distortion temperature while applying a pressure of at least 1 kg/cm² using a cooling roll (10) and a resilient nip roll (11) such that said laminated member (8) is brought into contact first with the resilient nip roll (11).

2. The process as claimed in claim 1, wherein the adhesive is a graft polymer of polyolefin and an $\alpha,\beta$-ethylenically unsaturated carboxylic acid.

3. The process as claimed in claim 1, wherein the adhesive is a polyolefin based resin prepared by heat-compounding a graft polymer of polyolefin and an $\alpha,\beta$-ethylenically unsaturated carboxylic acid, and a metal compound.

4. The process as claimed in claim 3, wherein the polyolefin based resin is prepared from 100 parts by weight of the carboxyl group-containing polyolefin and 0.05 to 10 parts by weight of the metal compound.

5. The process as claimed in claim 4, wherein the polyolefin based resin is prepared from a graft polymer of polypropylene and maleic acid, and aluminum hydroxide.

6. The process as claimed in claim 1, 2, 3, 4 or 5, wherein the heating and pressing at the first step is carried out by bringing the metal foil or sheet (1) of the laminated member in contact with a heated roll (3).

7. The process as claimed in claim 1, 2, 3, 4, or 5, wherein the adhesive is extruded as a molten film and sandwiched between the metal foil or sheet (1) and the thermoplastic resin film (4).

8. The process as claimed in claim 1, 2, 3, 4, or 5, wherein the thermoplastic resin film (4) is a polyolefin film or a nylon film.

9. The process as claimed in claim 1, 2, 3, 4, or 5, wherein the metal foil (1) is backed with a heat-resistant resin.

10. The process as claimed in claim 1, 2, 3, 4 or 5, wherein the second step is carried out at the softening point of the adhesive or more.

* * * * *